(12) United States Patent
Stieglitz et al.

(10) Patent No.: US 7,357,630 B2
(45) Date of Patent: Apr. 15, 2008

(54) CALIBRATION DEVICE

(75) Inventors: Henning Stieglitz, München (DE); Aron Altmann, Dachau (DE)

(73) Assignee: Krauss-Maffei Kunststofftechnik GmbH, München (DE)

( * ) Notice: Subject to any disclaimer, the term of this patent is extended or adjusted under 35 U.S.C. 154(b) by 0 days.

(21) Appl. No.: 11/284,303

(22) Filed: Nov. 21, 2005

(65) Prior Publication Data

US 2006/0071372 A1    Apr. 6, 2006

Related U.S. Application Data

(63) Continuation of application No. PCT/EP2004/005024, filed on May 11, 2004.

(30) Foreign Application Priority Data

May 24, 2003 (DE) ............................... 103 23 543

(51) Int. Cl.
*B29C 47/90* (2006.01)

(52) U.S. Cl. .................. 425/392; 425/71; 425/325; 425/326.1; 425/388

(58) Field of Classification Search .................. 425/71, 425/325, 326.1, 388, 392
See application file for complete search history.

(56) References Cited

U.S. PATENT DOCUMENTS

| | | | | |
|---|---|---|---|---|
| 2,423,260 A | | 7/1947 | Slaughter | |
| 2,847,036 A | * | 8/1958 | Dow | 138/45 |
| 3,980,418 A | * | 9/1976 | Schott, Jr. | 425/72.1 |
| 4,598,609 A | * | 7/1986 | Nellums et al. | 74/650 |
| 5,316,459 A | | 5/1994 | Melkonian et al. | |
| 5,480,295 A | * | 1/1996 | Greve | 425/71 |
| 7,112,047 B2 | * | 9/2006 | Schmuhl et al. | 425/68 |

FOREIGN PATENT DOCUMENTS

| | | | |
|---|---|---|---|
| DE | 23 59 975 A | | 6/1975 |
| DE | 198 43 340 | | 4/2000 |
| DE | 102 22 922 A | | 12/2002 |
| DE | 102 06 276 | * | 9/2003 |
| DE | 10 2004 029 498 | * | 10/2005 |
| DE | 10 2005 002 820 | * | 5/2006 |

* cited by examiner

*Primary Examiner*—Robert B. Davis
*Assistant Examiner*—Joseph Leyson
(74) *Attorney, Agent, or Firm*—Henry M. Feiereisen; Ursula B. Day

(57) ABSTRACT

A calibration device for calibrating extruded continuous profiles, in particular tubes, includes a housing and a plurality of segment bodies which are received in the housing in a substantially in circular manner, with axially neighboring segment bodies partially overlapping in a circumferential direction. Each segment body is made from a single-piece workpiece and has a contoured inner surface, wherein the inner surfaces of the segment bodies jointly define a calibration opening for passage of a tube. An operating device retains the segment bodies in the housing and allow adjustment of each segment body in radial direction.

7 Claims, 2 Drawing Sheets

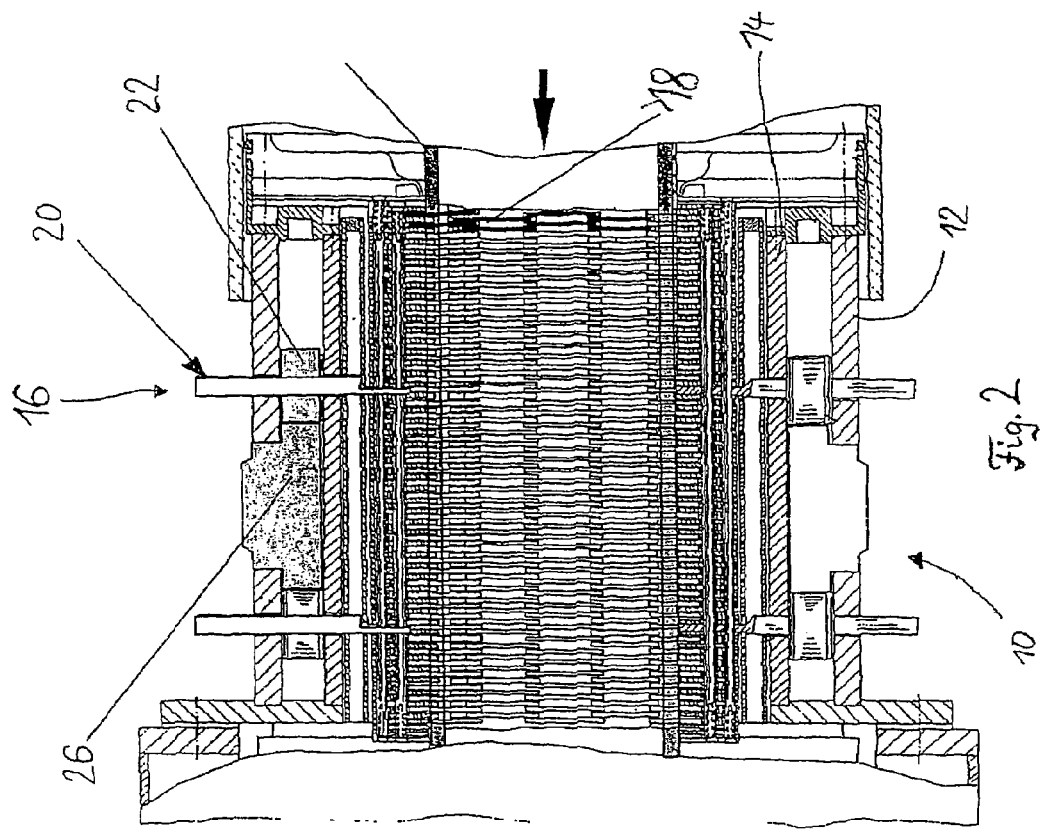
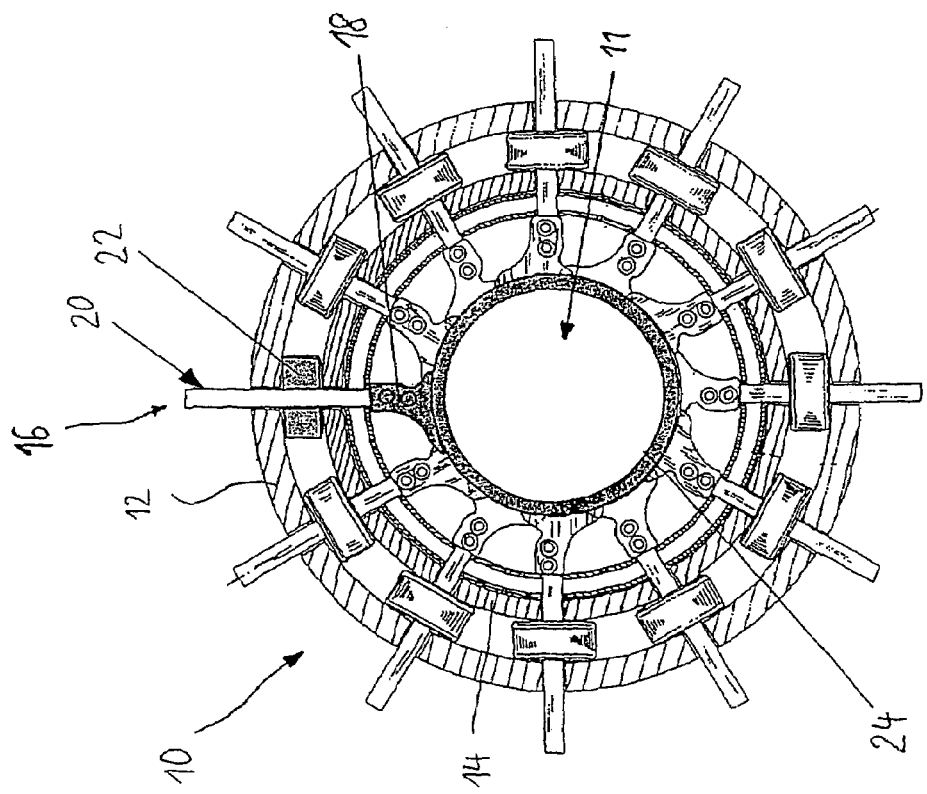

CALIBRATION DEVICE

CROSS-REFERENCES TO RELATED APPLICATIONS

This application is a continuation of prior filed copending PCT International application no. PCT/EP2004/005024, filed May 11, 2004, which designated the United States and on which priority is claimed under 35 U.S.C. §120, and which claims the priority of German Patent Application, Serial No. 103 23 543.4, filed May 24, 2003, pursuant to 35 U.S.C. 119(a)-(d), the subject matter of which is/are incorporated herein by reference.

BACKGROUND OF THE INVENTION

The present invention relates, in general, to a calibration device.

Calibration devices are used, for example, for calibrating extruded continuous profiles, in particular tubes. A plastic melt is hereby initially prepared in an extruder and shaped by an exit nozzle. Following the shaping process so as to assure a desired dimension, the continuous profile travels through the calibration device in which the profile is shaped to accurate size. Production of plastic tubes required heretofore the provision of different calibration devices for varying wall thicknesses or outer diameters. This requires exchange of respective parts, resulting in a shutdown of the machine and thus in downtimes.

German Offenlegungsschrift DE 198 43 340 C2 discloses an overall arrangement for making a plastic tube, including a calibration device which is adjustable to match varying tube diameters and has a plurality of lamellae which are distributed in spaced-apart relationship about the circumference on the outer side of a tube to be calibrated. The lamellae are rounded on their inner side, i.e. the circumferential direction of the tube, in correspondence to a greatest possible outer tube diameter and are combined to individual lamellae groups. Viewed in travel direction of the tube, a plurality of lamellae rims are arranged within a calibrating station, with gaps being provided between the individual lamellae of the individual segment rims so as to allow adjustment of the individual segments in relation to the segments of the next rim or preceding rim.

This conventional calibration device has shortcomings primarily because of the requirement to line up the individual segments in rows so that assembly becomes laborious and thus cost-intensive. Furthermore, unavoidable manufacturing tolerances can add up, so that ultimately proper installation of the lamellae is adversely affected.

It would therefore be desirable and advantageous to provide an improved calibration device which obviates prior art shortcomings and which is simple in structure and easy to assemble and can be made in the absence of excessive manufacturing tolerances.

SUMMARY OF THE INVENTION

According to one aspect of the present invention, a calibration device for calibrating an extruded continuous profile, in particular a tube, includes a housing, a plurality of segment bodies received in the housing in a substantially in circular manner, with axially neighboring segment bodies partially overlapping in a circumferential direction, each segment body being made from a single-piece workpiece and having a contoured inner surface, wherein the inner surfaces of the segment bodies jointly define a calibration opening for passage of a profile, and an operating device for retaining the segment bodies in the housing and allowing adjustment of each segment body in radial direction.

According to another aspect of the present invention, a calibration device for calibrating an extruded continuous profile, in particular a tube, includes a housing, a plurality of segment bodies received in the housing in a substantially in circular manner, with axially neighboring segment bodies partially overlapping in a circumferential direction, each segment body being made from a single-piece workpiece and having a contoured inner surface which is formed by an insert attached to the segment body, wherein the inner surfaces of the segment bodies jointly define a calibration opening for passage of a profile, and an operating device for retaining the segment bodies in the housing and allowing adjustment of each segment body in radial direction.

The present invention resolves prior art problems by providing support bodies which can each be made from a single workpiece, thereby eliminating the need for single lamellae that have to be lined up in a cumbersome manner. The support bodies can easily be made in a simple and quick manner within manufacturing tolerances and are easy to assembly.

There are many possibilities to manufacture or configure the segment body in one piece. The segment body may be cut from one workpiece through a milling process. The workpiece may be made of metal and cast in a mold. Of course, the use of other materials, like plastic, is possible for making the segment body. The contoured inner surface for the calibration opening can be provided directly in the workpiece. In this way, it is possible, to appropriately coat the respectively finished inner surface so as to provide a surface which is as free of friction and resistant to wear as possible. It is also conceivable to produce a type of lamellae structure or another structure through cutting grooves into the workpiece.

According to another feature of the present invention, each segment body may be made from a plastic workpiece, and separate contoured elements of metal for example, may be attached onto the workpiece for defining the contoured inner surface of the segment body. These elements may hereby have the shape of a plurality of lamellae segments. Suitably, the lamellae segments may have a crescent-shaped configuration.

BRIEF DESCRIPTION OF THE DRAWING

Other features and advantages of the present invention will be more readily apparent upon reading the following description of currently preferred exemplified embodiments of the invention with reference to the accompanying drawing, in which:

FIG. 1 shows a schematic sectional view of a basic configuration of a calibration device as viewed in a direction perpendicular to a travel direction of a tube;

FIG. 2 shows a schematic side view of the calibration device in parallel relationship to the travel direction of the tube;

DETAILED DESCRIPTION OF PREFERRED EMBODIMENTS

Figure 3:
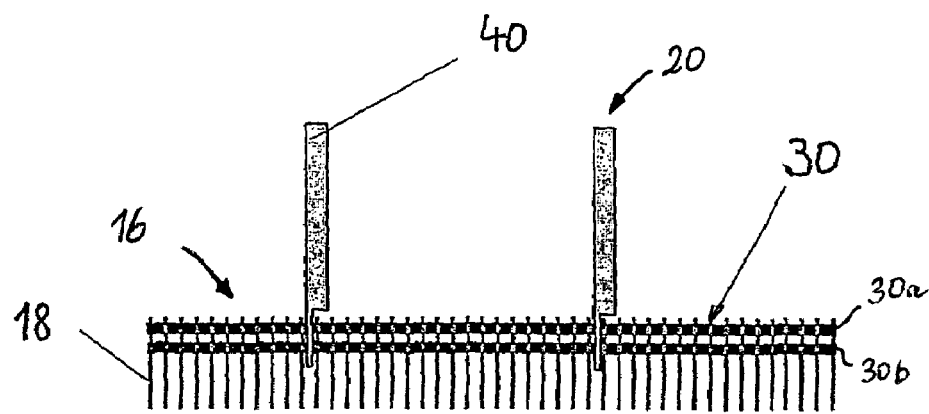
FIG. 3 shows a schematic simplified illustration of a segment block for use in the calibration device.

Throughout all the Figures, same or corresponding elements are generally indicated by same reference numerals. These depicted embodiments are to be understood as illustrative of the invention and not as limiting in any way. It should also be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIGS. 1 and 2, there are shown schematic sectional views of a basic configuration of a calibration device, generally designated by reference numeral 10 and forming part of an overall extrusion plant for making a plastic tube 24. A specific construction and mode of operation of such an extrusion plant is fully described in German Offenlegungsschrift DE 198 43 340 C2, to which reference is made herewith. The adjustable calibration device 10 represents a core component of the tube extrusion plant with option to change dimensions. It assumes the shaping task of a standard calibration, but may be infinitely adjustable across a diameter range which is predefined based on the construction.

Reference is also made to commonly assigned copending patent application Ser. No. 10/552,026, filed Oct. 24, 2005 by a different inventive entity and has issued as U.S. Pat. No. 7,293,975, and is entitled "Calibration Device", the disclosure of which is incorporated herein by reference.

Adjustment of the calibration device 10 is rendered possible by forming the surface resting upon the tube 24 through a great number of single segments 18. The segments 18 shown in FIG. 1, are rounded along their inner side, i.e. the circumferential direction of the tube, in correspondence to a greatest possible outer tube diameter and are combined to individual segment groups. These segment groups include individual lamellae which, as viewed in travel direction of the tube, are spaced apart but placed in close proximity. Two successive segment rims are combined to a dimension rim and arranged in offset relationship with clearance. This ensures the absence of any edges during passage of the tube through the calibration device. The individual segment surfaces form jointly a substantially smooth inner tube surface with substantially circular geometry.

Referring now to FIG. 3, there is shown a schematic simplified illustration of a segment block 16 for use in the calibration device 10 and described in detail in the aforementioned commonly assigned copending earlier filed patent application Ser. No. 10/552,026, now U.S. Pat. No. 7,293,975. The segments 18 are positioned axially behind one another and combined to form the segment block 16 in travel direction of the tube 24. A support structure 30 is hereby used for supporting the segments block 16 and includes essentially two rods 30a, 30b on which the single segments 18 are lined up. The support structure 30 is connected with a mounting and actuating apparatus 20 (FIGS. 1 and 2) which connects the respective segment blocks 16 with a housing of the calibration device 10 in radially adjustable manner. The housing of the calibration device 10 includes two cylindrical housing portions 12, 14 which are coaxially nested within one another. The housing portions 12, 14 accommodate the individual segment blocks 16 in a circular manner.

As described above, each segment block 16 includes lamellae (segments) 18 arranged in succession and secured to the support rods 30a, 30b that form the support structure 30. Two externally threaded rods 40 are arranged in axially spaced-apart relationship upon the support rods 30a, 30b and serve as spindle carriers 20. When the calibration device 10 is completely assembled, the externally threaded rods 40 are received in associated bores of the housing portions 12, 14. Provided for each externally threaded rod 40 is a gear nut 22 (FIG. 2) between both housing cylinders 12, 14 for interaction with the outer thread of the externally threaded rod 40 in an adjustable manner.

Disposed in form of a circle in perpendicular relationship to the travel direction of the tube 24 (compare FIG. 1) are twelve segment blocks 16. Each segment block 16 includes two spindle carriers 20 disposed in axially spaced-apart relationship (FIG. 2) and respectively interacting with a pertaining gear nut 22. The gear nuts 22 in turn are adjusted in unison by a gear ring 26 which extends on the circumference between the axially spaced gear nuts 22. The gear ring 26 includes hereby on both its edges teeth which mesh with the gear nuts 22.

Actuation of the gear ring 26 enables radially outward or inward adjustment of all segment blocks 16 simultaneously and in a same manner. Radial adjustment of all segment blocks 16 in like manner establishes a variable calibration diameter. Thus, the outer diameter of the tube 24 to be calibrated can be defined within the adjustment range.

Figure 4:
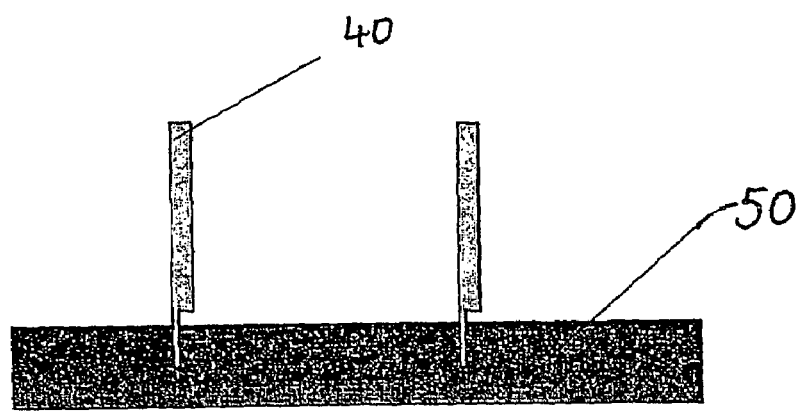
FIG. 4 shows a schematic simplified illustration of a currently preferred embodiment of a segment body according to the invention.

Turning now to FIG. 4, there is shown a schematic simplified illustration of a currently preferred embodiment of a segment block according to the invention. The segment block is here made from a workpiece to form a respective segment body 50. Although not shown in detail, the segment body 50 is formed on the inside with a contoured profile by which a calibration opening 11 (FIG. 1) is defined. As a result, a smooth, optionally coated, surface can be provided to form an arched tube segment portion. Unillustrated teeth may be arranged on its sides to ensure an overlap of individual neighboring segment bodies 50.

Of course, structures may also be formed in the inner surface of each segment body 50. Examples include the provision in the segment body 50 of spaced-apart parallel grooves to form lamellae-type protrusions on the inside of the segment body 50. The workpiece for making the segment body 50 can be cast from metal and subsequently refinished. In particular, surfaces may be constructed through milling.

Figure 5:
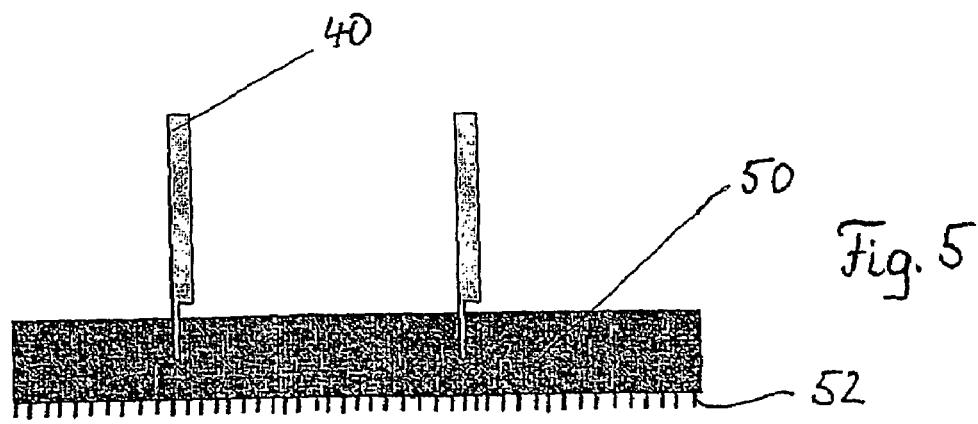
FIG. 5 shows a schematic simplified illustration of another currently preferred embodiment of a segment body according to the invention.

FIG. 5 shows a schematic simplified illustration of another currently preferred embodiment of a segment body 50 according to the invention. Parts corresponding with those in FIG. 4 are denoted by identical reference numerals and not explained again. The description below will center on the differences between the embodiments. In this embodiment, provision is made for a segment body 50 which is made of plastic in which crescent-shaped metal lamellae 52 are formed on an inner side that subsequently confront the tube 24. This configuration has the advantage that the plastic segment body 50 can be manufactured fairly cost-effective and easily, whereas the metal lamellae 52 are resistant and can be manufactured with precision.

Of course, other possibilities are conceivable as well to make the segment body 50 of substantial single-piece configuration and then i) to configure the inner surface either at or in the workpiece itself, or ii) to insert the inner surface upon or in the workpiece.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein.

What is claimed is:

1. A calibration device for calibrating an extruded continuous profile, in particular a tube, comprising:
   a housing;
   a plurality of segment bodies received in the housing in a substantially circular manner, with axially neighboring segment bodies partially overlapping in a circumferential direction, each said segment body being made from a single-piece segment block having a contoured inner surface to form an arched tube segment portion of a profile, wherein the inner surfaces of the segment bodies jointly define a calibration opening for passage of the profile; and
   an operating device for retaining the segment bodies in the housing and allowing adjustment of each segment body in radial direction,
   wherein the inner surface of the segment body is grooved to have the shape of a plurality of lamellae segments.

2. The calibration device of claim 1, wherein each said segment body is formed from the workpiece through a milling process.

3. The calibration device of claim 1, wherein each said segment body is formed from the workpiece through a metal casting process.

4. A calibration device for calibrating an extruded continuous profile, in particular a tube, comprising:
   a housing;
   a plurality of segment bodies received in the housing in a substantially circular manner, with axially neighboring segment bodies partially overlapping in a circumferential direction, each said segment body being made from a single-piece segment block having a contoured inner surface which is formed by an insert attached to the segment body and configured to form an arched tube segment portion of a profile, wherein the inner surfaces of the segment bodies jointly define a calibration opening for passage of the profile; and
   an operating device for retaining the segment bodies in the housing and allowing adjustment of each segment body in radial direction,
   wherein each said segment body is made of plastic, and wherein the insert is made of metal.

5. The calibration device of claim 4, wherein each said segment body is formed from the workpiece through a milling process.

6. The calibration device of claim 4, wherein the metal insert is constructed to have the shape of a plurality of lamellae segments.

7. The calibration device of claim 6, wherein the segments have a crescent-shaped configuration.

* * * * *